(12) United States Patent
Boerensen (10) Patent No.: US 10,746,067 B2
(45) Date of Patent: Aug. 18, 2020

(54) METHODS AND SYSTEMS FOR REGENERATING A PARTICLE FILTER

(71) Applicant: Ford Global Technologies, LLC, Dearborn, MI (US)

(72) Inventor: Christoph Boerensen, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 71 days.

(21) Appl. No.: 16/005,540

(22) Filed: Jun. 11, 2018

(65) Prior Publication Data

US 2019/0048773 A1    Feb. 14, 2019

(30) Foreign Application Priority Data

Aug. 8, 2017    (DE) .......................... 10 2017 213 740

(51) Int. Cl.
| | |
|---|---|
| *F01N 3/029* | (2006.01) |
| *F01N 3/035* | (2006.01) |
| *B01D 53/94* | (2006.01) |
| *F01N 3/021* | (2006.01) |
| *B01D 53/96* | (2006.01) |

(Continued)

(52) U.S. Cl.
CPC ....... *F01N 3/0293* (2013.01); *B01D 53/9477* (2013.01); *B01D 53/96* (2013.01); *F01N 3/021* (2013.01); *F01N 3/035* (2013.01); *F01N 3/08* (2013.01); *F02D 41/029* (2013.01); *F02D 41/405* (2013.01); *B01D 2251/95* (2013.01); *F01N 3/206* (2013.01); *F01N 3/2066* (2013.01); *F01N 2510/06* (2013.01); *F01N 2610/00* (2013.01); *F01N 2900/08* (2013.01); *Y02A 50/2325* (2018.01); *Y02A 50/2358* (2018.01)

(58) Field of Classification Search
CPC combination set(s) only.
See application file for complete search history.

(56) References Cited

U.S. PATENT DOCUMENTS

| | | | | |
|---|---|---|---|---|
| 6,984,317 | B2 | 1/2006 | Hiatt et al. | |
| 7,603,878 | B2 * | 10/2009 | Fyvie | D06F 43/08 68/18 R |

(Continued)

FOREIGN PATENT DOCUMENTS

| | | |
|---|---|---|
| CN | 101564643 A | 10/2009 |
| CN | 103557056 A | 2/2014 |

(Continued)

OTHER PUBLICATIONS

Bik, H. et al., "Dramatic Shifts in Benthic Microbial Eukaryote Communities following the Deepwater Horizon Oil Spill," PLoS ONE, vol. 7, No. 6, Jun. 6, 2012, 6 pages.

(Continued)

*Primary Examiner* — Binh Q Tran
(74) *Attorney, Agent, or Firm* — Geoffrey Brumbaugh; McCoy Russell LLP (57) ABSTRACT

Methods and system are provided for an arrangement having a combustion engine producing an exhaust gas flow, and an exhaust system connected to the combustion engine for receiving the exhaust gas flow, having a particle filter as exhaust gas aftertreatment device, and a feed device positioned to introduce a micro-organism capable of breaking down carbon-containing compounds directly to an exhaust passage receiving the exhaust gas flow.

19 Claims, 5 Drawing Sheets

(51) Int. Cl.
  *F01N 3/08* (2006.01)
  *F02D 41/02* (2006.01)
  *F02D 41/40* (2006.01)
  *F01N 3/20* (2006.01)

(56) References Cited

U.S. PATENT DOCUMENTS

| | | | | |
|---|---|---|---|---|
| 9,518,487 | B2* | 12/2016 | Coelho Ferreira | F01N 3/035 |
| 9,890,399 | B2* | 2/2018 | Simpson | C12P 1/04 |
| 2006/0096456 | A1* | 5/2006 | Schroeter | H01M 8/0662 |
| | | | | 95/273 |
| 2010/0291661 | A1* | 11/2010 | Kubota | B01D 53/62 |
| | | | | 435/266 |
| 2015/0367270 | A1* | 12/2015 | Mazumder | B01D 46/0001 |
| | | | | 96/226 |

FOREIGN PATENT DOCUMENTS

| | | |
|---|---|---|
| CN | 104594983 A | 5/2015 |
| CN | 204552895 U | 8/2015 |
| DE | 19903215 A1 | 12/1999 |
| EP | 2110524 A2 | 10/2009 |
| JP | H11276850 A | 10/1999 |
| JP | 2002361031 A | 12/2002 |

OTHER PUBLICATIONS

Yandell, K., "On the Trail of Oil-Munching Organisms," New York Times Website, Available Online at https://green.blogs.nytimes.com/2012/06/14/on-the-trail-of-oil-munching-organisms/?r=0, Jun. 14, 2012, 3 pages.

* cited by examiner

METHODS AND SYSTEMS FOR REGENERATING A PARTICLE FILTER

CROSS REFERENCE TO RELATED APPLICATION

This application claims priority to German Patent Application No. 102017213740.1, filed Aug. 8, 2017. The entire contents of the above-referenced application are hereby incorporated by reference in its entirety for all purposes.

FIELD

The present description relates generally to regenerating a particulate filter via an injection.

BACKGROUND/SUMMARY

Particle filters may be used for engines with compression ignition and applied ignition. Once a certain quantity of fine dust, for example in the form of soot and/or unburned hydrocarbons, has collected in the particle filter, removal may be desired (regeneration of the particle filter), in order to minimize a likelihood of degrading the particle filter and to decrease backpressure.

One method for regenerating the particulate filter uses nitrogen dioxide (NO2) contained in the exhaust gas for continuous oxidation of the soot to form carbon dioxide (CO2) and nitrogen monoxide (NO). This method demands sufficiently high temperatures and NO2 concentrations which may be achieved only in full-load operation of the combustion engine, for example in freeway driving. In partial-load operation, on the other hand, for example in urban driving, this method may be executed during only some driving conditions, which may decrease particulate filter longevity. These shortcomings may be further exasperated due to unpredictable driving (e.g., driving short distances, long distances, on hilly terrain, on freeways, etc.) which may not lead to full-load operation, resulting in passive regeneration conditions not being met.

In addition, government agencies may demand the reduction of NOx emissions, so that NO2 is removed from the exhaust gas flow after leaving the combustion engine, and consequently is no longer available for particle filter regeneration.

Another method of particle filter regeneration may utilize increasing the exhaust gas temperature, so that a regeneration temperature may be met. Additional fuel may be used to increase the exhaust gas temperature, resulting in an active regeneration. This can be delivered via a post-injection into the combustion chamber of the combustion engine or into the exhaust gas flow downstream of the combustion engine.

Regeneration of the particle filter may be accompanied by further measures such as a restrictor along the air path (flow path of the exhaust gas flow), for example, and may be desired after several hundred kilometers. The measures described may also be combined with one another.

A regeneration condition of the particle filter temperatures may include a regeneration temperature equal to approximately 600° C. present for a threshold duration of time (e.g., minutes). Introduction of additives may decrease the regeneration temperature to 450° C. These temperatures can only be achieved if certain operating parameters demanded of the combustion engine are fulfilled, for example the period of operation and the speed of a vehicle powered by the combustion engine.

If the combustion engine is run only for short periods, on the other hand, possibly with prolonged intervening pauses, then regeneration temperatures may not be reached and the particle filter cannot be successfully regenerated, so that more and more soot accumulates in the particle filter. As a result, for example, the driver of a vehicle having such a combustion engine, may be called upon, for example by means of a corresponding display on the instrument panel, to run the combustion engine in full-load operation, for example by using the freeway for a certain length of time, or to find a workshop or a dealer, in order to have a regeneration performed on the particle filter and to prevent clogging and degradation of the particle filter.

Certain bacteria or fungi in seaweed are also known to decompose carbon-laden impurities, for example crude oil, (Bik H M, Halanych K M, Sharma J, Thomas W K (2012) Dramatic Shifts in Benthic Microbial Eukaryote Communities following the Deepwater Horizon Oil Spill. PLoS ONE 7(6): e38550. https://doi.org/10.1371/journal.pone.0038550).

The bacteria may be termed hydrocarbonoclastic bacteria (HCBs). They occur naturally but due to a lack of nutrients are generally only found in very low concentrations.

The present disclosure describes a possible way of reducing or eliminating the problems described and the resulting benefits. In one examples, the problems may be at least partially solved by certain micro-organisms, which are capable of breaking down carbon-laden constituents contained in the soot, able to remove soot from the particle filter at low temperatures. The inventors have recognized that the naturally occurring micro-organisms such as HCBs, for example, which are capable of breaking down carbon-laden contaminants, encounter optimum living conditions in or on a particle filter, since the filtered soot constitutes a source of carbon and hydrocarbons; oxygen is present in the ambient air, and a desired quantity of water is also available, which is produced by the combustion process in the combustion engine and condensation once the combustion engine has been switched off.

The regeneration process here is a slow process compared to the methods described in the previous example and is also capable of running, for example, whilst the combustion engine is switched off and not in an operating state, for example whilst a motor vehicle according to the disclosure is parked.

A method according to the disclosure is therefore also suitable for regenerating the particle filter for combustion engines in partial-load operation, for example in motor vehicles which are used predominantly for short distances. A desire to deliver additional fuel or fuel additives can be reduced or even entirely eliminated.

A particle filter according to the disclosure for removing carbon-laden soot from the exhaust gas flow of a combustion engine comprises micro-organisms that break down constituents, in particular carbon-laden constituents, contained in the soot.

For example, the micro-organisms may be disposed on, next to and/or in the particle filter. The particle filter may take the form of a wall-flow filter, in which the exhaust gas flow flows through a porous wall in the particle filter. The porous wall may be built up from fibers and/or powders, which may comprise ceramics and/or metals.

Conditions for breaking down constituents contained in the soot may be relatively severe, wherein temperatures may fluctuate from low to high. Thus, it may be desired of a micro-organism configured to break down the soot to be able to withstand large temperature changes. One example of such a micro-organism may include hydrocarbonoclastic bacteria, fungi, and/or archaea, as they have a high tolerance to variations in temperature.

In some embodiments, an arrangement of the present disclosure comprises a combustion engine producing an exhaust gas flow, and an exhaust system connected to the combustion engine for receiving the exhaust gas flow, having a particle filter as exhaust gas aftertreatment device. In some embodiments, the particle filter may take the form of a diesel particle filter or an SCR-coated particle filter, that is to say a particle filter which also serves for selective catalytic reduction.

The arrangement may further comprise devices for regenerating the particle filter. More specifically, the arrangement may further comprise device for regenerating the particle filter during conditions where regeneration via the micro-organisms proceeds too slowly, for example, because the operating characteristics of the combustion engine cause more fine dust to accumulate in the particle filter than can be broken down. During such engine conditions, other measures can be taken to regenerate the particle filter, such as the arrangement of an exothermic catalytic converter, for example, which generates heat from unburned fuel by an exothermic reaction, upstream of the particle filter, or the delivery of additional fuel, as described above.

In some embodiments, the exhaust system may further comprise a feed device for delivering a composition having the micro-organisms that break down constituents contained in the fine dust to the exhaust gas flow and/or directly to the particle filter. In some examples, the micro-organisms are hydrocarbonoclastic micro-organisms.

In some examples, the feed device may be arranged upstream of the particle filter to deliver the micro-organisms to the exhaust gas flow upstream of the particle filter. Delivering the micro-organisms to the exhaust gas flow allows the composition to flow to the particle filter together with exhaust gas. The feed device may be an injector.

The composition, for example, may be an aqueous composition, such as an aqueous suspension of the micro-organisms, for example. The composition may optionally comprise one or more additives for exhaust gas aftertreatment, for example an ammonia-forming additive such as a urea solution for treatment of the exhaust gas flow in an SCR catalytic converter.

The feed device may comprise a controllable valve and/or a controllable pump device, so as to be able to control or regulate the quantity of the composition to be delivered. Control or regulation may be undertaken, for example, as a function of prevailing pressures and/or temperatures.

The feed device enables the micro-organisms to be delivered to the particle filter. Depending on conditions, for example as a function of the prevailing temperatures, a delivery of the micro-organisms may be desired more or less often, in order to counteract a reduction in the number of micro-organisms and to maintain the regeneration of the particle filter via the micro-organisms.

In some embodiments, the exhaust system may comprise a reservoir for the composition comprising the micro-organisms coupled to the feed device. A hose or similar device may fluidly couple the reservoir to the feed device.

The reservoir, for example, may be an existing reservoir for an exhaust gas aftertreatment additive, for example a tank for a urea solution. Thus, the micro-organism may be mixed with the urea solution.

In some embodiments, the exhaust system may comprise at least one further exhaust gas aftertreatment device. The feed device may be shaped to deliver the composition to the exhaust gas flow upstream or downstream of the further exhaust gas aftertreatment device. In some examples, more than one feed device may be arranged in an exhaust passage such that a first feed device may deliver the composition to the exhaust gas flow upstream of the further exhaust gas aftertreatment device and a second feed device may deliver the composition downstream of the further exhaust gas aftertreatment device. The further exhaust gas aftertreatment device may be upstream of the exhaust gas aftertreatment device.

The further exhaust gas aftertreatment device, for example, may be an oxidation catalytic converter, for example a diesel oxidation catalytic converter, a nitrogen oxide storage catalytic converter, or an SCR catalytic converter.

In order to prevent the further exhaust gas aftertreatment device impairing the regeneration effect of the micro-organisms, it may be desired to deliver the composition having the micro-organisms to the exhaust gas flow only downstream of the further exhaust gas aftertreatment device.

If the further exhaust gas aftertreatment device is an SCR catalytic converter, for example, delivery upstream of the SCR catalytic converter may be desired. This allows delivery in conjunction with the ammonia-forming additive needed by the SCR catalytic converter, obviating the desire for a further feed device and a further reservoir.

In some embodiments, the arrangement may comprise a control unit, which is designed to control the feed device as a function of the temperature, for example the temperature of the particle filter or the temperature of the exhaust gas flow upstream of the particle filter, and/or of the pressure, for example the pressure of the exhaust gas flow upstream of the particle filter, and/or as a function of an operating state of the combustion engine, for example as a function of whether the combustion engine is in an on or off state, and/or the time which has elapsed since a specific event, for example switching-off of the combustion engine, or the time remaining until a specific event.

The temperature may be determined via feedback from a temperature sensor, and the pressures via feedback from a pressure sensor. The control unit allows delivery of the composition to be controlled according to one or more of temperature and pressure. If it is estimated, for example, that the particle filter comprises an insufficient number of micro-organisms for regenerating the particle filter, a larger quantity of the composition may be delivered. The delivery may furthermore be purposely increased if regeneration conditions of the particle filter by the micro-organisms may be such that a regeneration rate may be increased. This may be the case, for example, after switching off the combustion engine, since then the temperature of the exhaust gas flow and hence also the temperature of the particle filter fall, so that thermal degradation of the micro-organisms is reduced.

Further embodiments of the exhaust system may furthermore comprise a tailpipe and where the particle filter may be arranged in the area of the tailpipe.

Towards the outlet of the exhaust system, that is to say with increasing distance from the combustion engine, the temperature of the exhaust gas flow may diminish. Since in contrast to the existing methods for regenerating the particle filter, the regeneration according to the disclosure by means of micro-organisms may not desire high temperatures, the micro-organisms instead being capable, for example, of regenerating the particle filter even at ambient temperature, the particle filter according to the disclosure can also be arranged proximally to the tailpipe outside of a close-coupled position where exhaust gas temperatures and pressures are lower.

This moreover has the effect, as the temperature falls, of also reducing the volumetric flow and hence the backpressure, so that the complications due to the backpressure, as initially described, can be reduced or even prevented.

Furthermore, arranging the particle filter in the area of the tailpipe creates more overall space for the arrangement of further exhaust gas aftertreatment devices in proximity to the combustion engine. This may be desired for exhaust gas aftertreatment devices which are adequately efficient only at high temperatures, for example catalytic converters which desire a rapid rise to their light-off temperature to reduce the pollutant emissions sufficiently.

A motor vehicle according to the disclosure comprises one of the arrangements previously described. The term "motor vehicle" is taken to mean a vehicle powered by an engine, for example a land vehicle, an aircraft or a watercraft.

A method according to the disclosure for regenerating a particle filter arranged in an exhaust gas flow from a combustion engine, for example the combustion engine of a motor vehicle, as exhaust gas aftertreatment device comprises bringing the particle filter into contact with micro-organisms that break down constituents contained in the fine dust.

They may be brought into contact, for example, by disposing the micro-organisms on, next to or in the particle filter, so that constituents, in particular carbon-laden constituents, contained in the filtered fine dust can be broken down.

In some examples, the micro-organisms that break down constituents contained in the fine dust may be selected from a group comprising hydrocarbonoclastic bacteria, fungi, and archaea.

Thus, in one example, the problems described above may be at least partially solved by a method for regenerating a particle filter via a micro-organism that breaks down carbon-containing compounds during a first condition. The first condition may include where an engine is deactivated, wherein fuel delivery to the deactivated engine is prevented.

In some examples, the method further comprises a delivery of a composition having the micro-organisms that break constituents contained in the fine dust to the exhaust gas flow, for example upstream of the particle filter, and/or directly to the particle filter.

In some examples, the composition may be delivered together with an additive for an SCR catalytic converter. The additive may be an ammonia-forming composition, for example a urea solution.

In some examples, delivery of the composition may be initiated by switching off the combustion engine, followed by a significant reduction of a temperature or a pressure or by the elapsing of a period of time.

In other words, delivery may be performed as a function of one of said initiating events. This can allow a delivery of the composition tailored to the need, for example matched to the operation of the combustion engine.

Initiating delivery of the composition by switching off the combustion engine serves to ensure that a fresh population of micro-organisms is fed to the particle filter, which may regenerate the filter during an operating state when the combustion engine is switched off, for example during a motor vehicle parking operation. A more rapid regeneration of the particle filter can thereby be achieved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
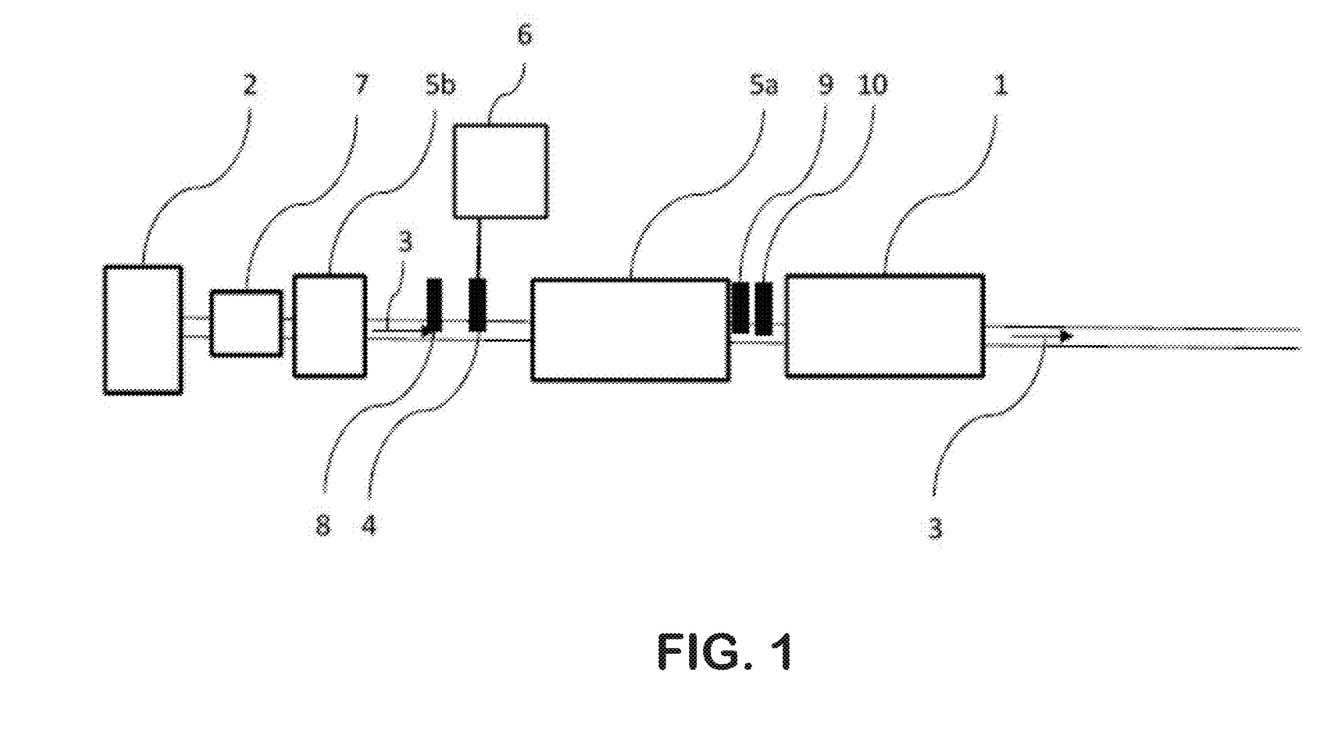
FIG. 1 shows a schematic representation of an example of an arrangement
Figure 2:
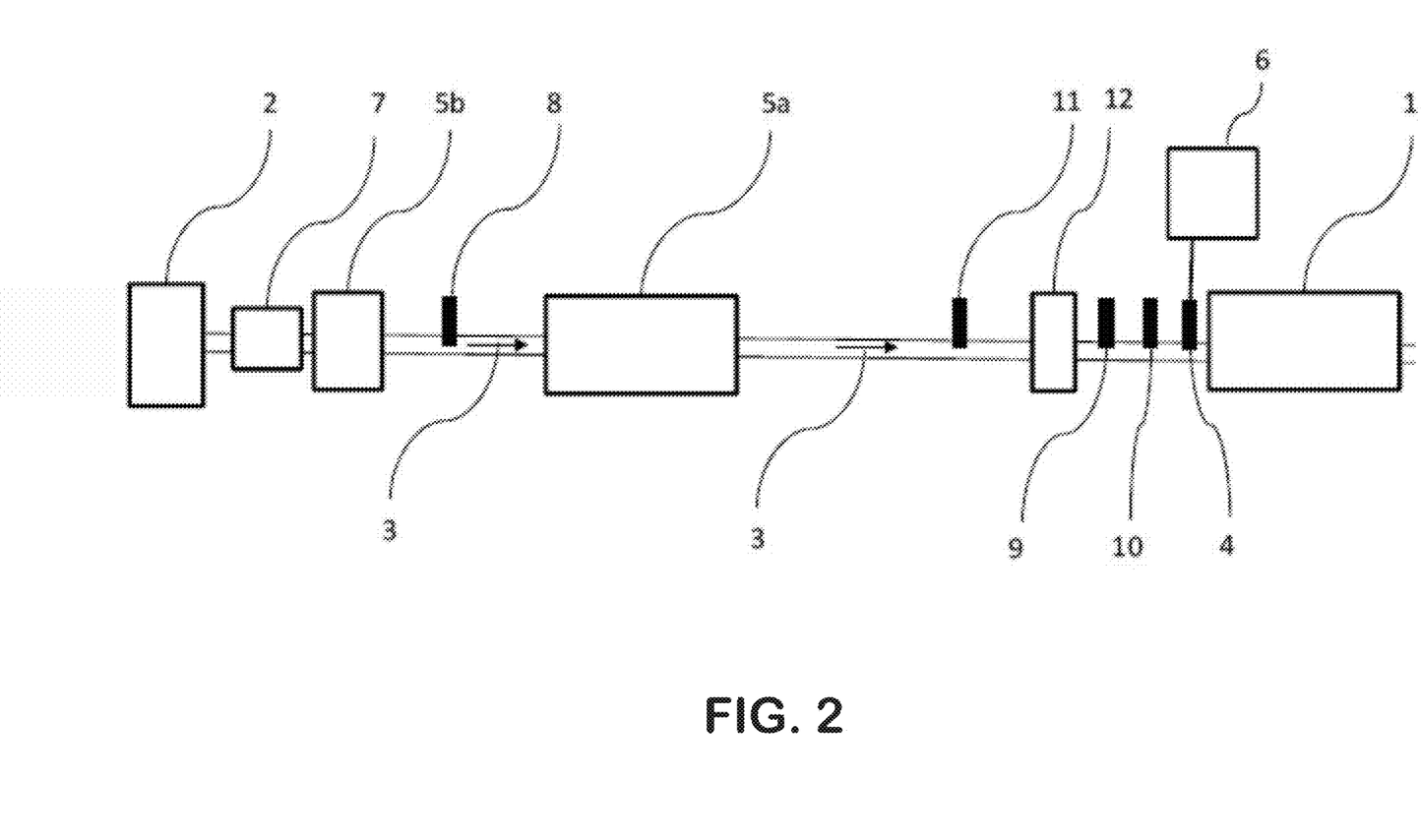
FIG. 2 shows a schematic representation of a further example of an arrangement
Figure 3:
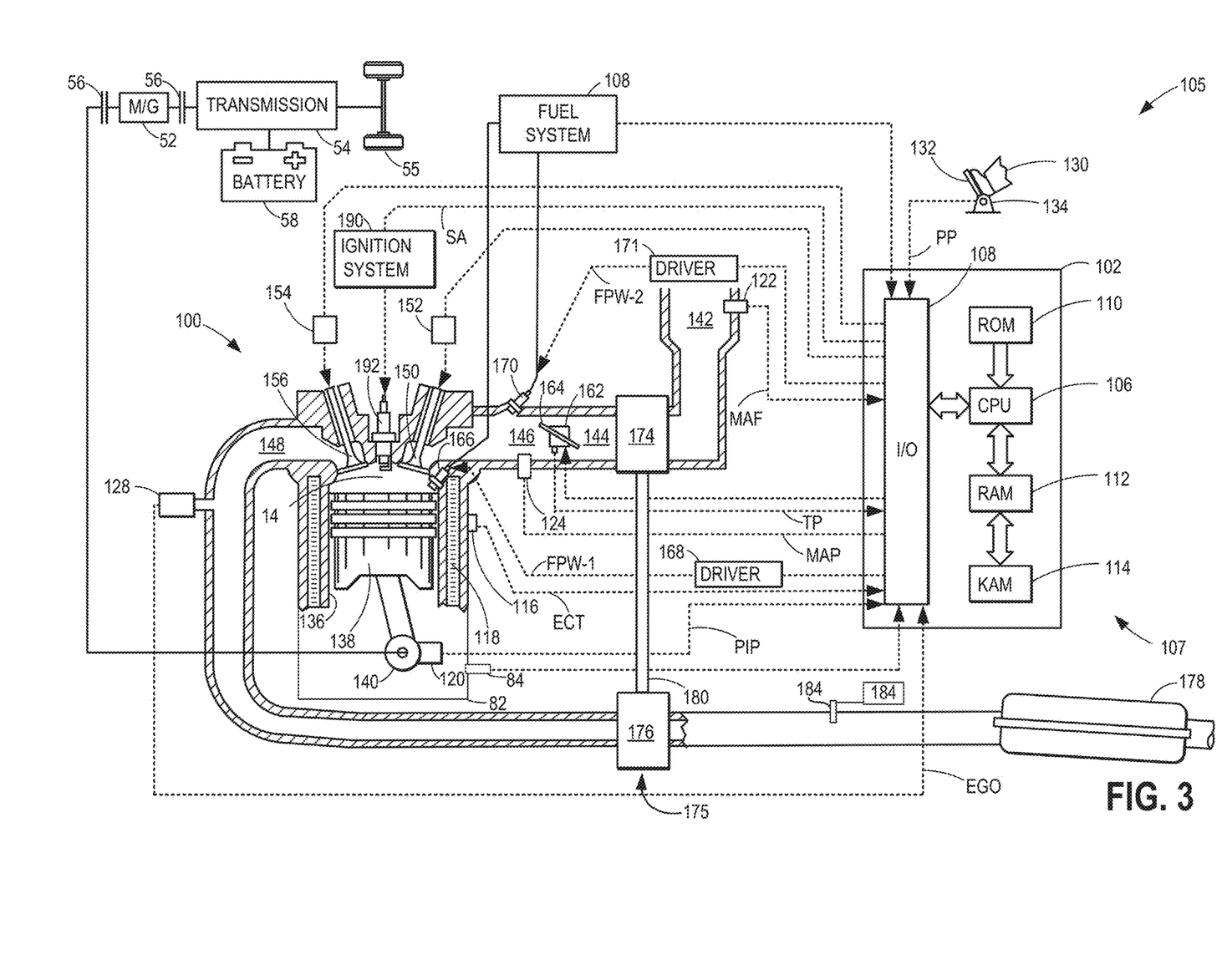
FIG. 3 shows a schematic of an engine included in a hybrid vehicle.
Figure 4:
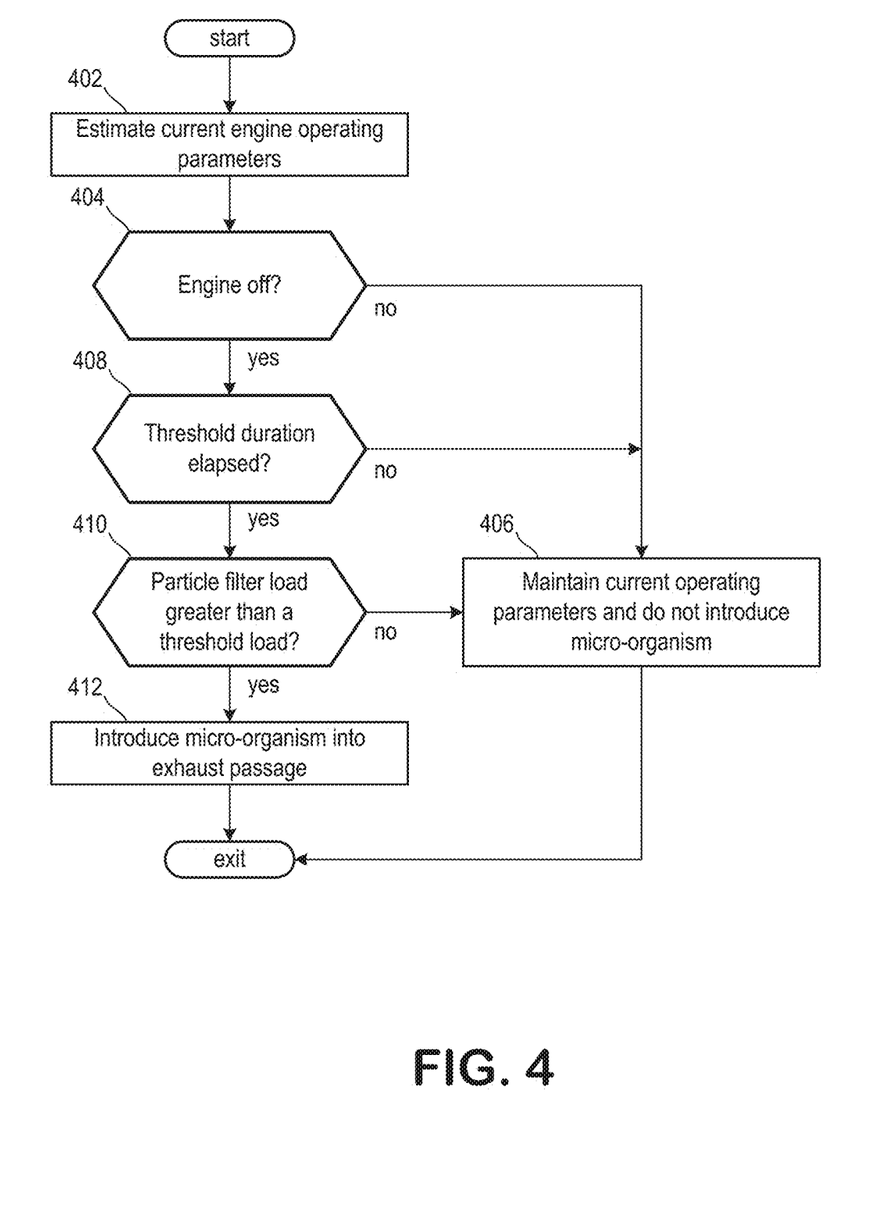
FIG. 4 shows a method for introducing a composition comprising the micro-organism into an exhaust passage.
Figure 5:
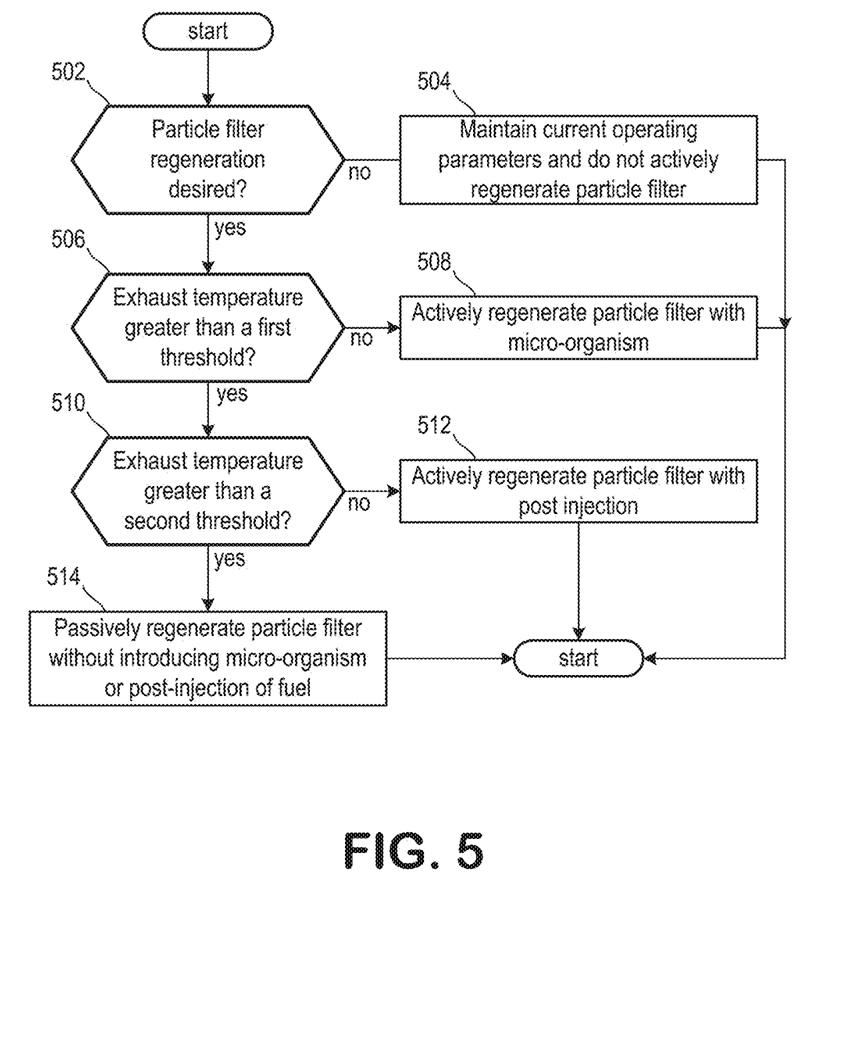
FIG. 5 shows a method for determining to execute an active or a passive regeneration of a particle filter.

The following description relates to systems and methods for a particle filter arranged in an exhaust passage fluidly coupled directly to an engine. A feed device is positioned to introduce a composition comprising a micro-organism directly into the exhaust passage. FIGS. 1 and 2 show first and second embodiments of an arrangement comprising the particle filter. FIG. 3 shows a schematic of an engine included in a hybrid vehicle. FIGS. 4 and 5 show methods for regenerating the particle filter.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 1, an example of an arrangement therein comprises a combustion engine 2 producing an exhaust gas flow 3, and an exhaust system connected to the combustion engine 2 for receiving the exhaust gas flow 3. The exhaust system furthermore comprises a particle filter 1 as an exhaust gas aftertreatment device. The arrangement may be arranged in a motor vehicle.

The particle filter 1 may be shaped to capture carbon-laden fine dust from the exhaust gas flow 3 from the combustion engine 2. The particle filter 1 here may optionally be a particle filter having an SCR coating, which besides filtering fine dust out of the exhaust gas flow 3 may serve for the catalytic reduction of nitrogen oxides contained in the exhaust gas flow 3. In this case the arrangement of an additional SCR catalytic converter may be avoided, thereby decreasing manufacturing costs and packaging restraints.

The particle filter 1 may be adsorb hydrocarbonoclastic bacteria as micro-organisms (not represented) that break down constituents contained in the fine dust.

In addition, the exhaust system of the arrangement comprises a feed device 4 shaped for delivering a composition having the hydrocarbonoclastic bacteria to the exhaust gas flow, which may be arranged upstream of the particle filter 1. The feed device 4 may be fluidly connected to a reservoir 6. The reservoir 6 may store the composition.

Besides the particle filter 1, the exhaust system comprises two further exhaust gas aftertreatment devices 5a, 5b arranged therein. Herein, the further exhaust gas aftertreatment device 5a is a first aftertreatment device and the further exhaust gas aftertreatment device 5b is a second aftertreatment device. The first aftertreatment device 5a may comprise an SCR catalytic converter or nitrogen storage catalytic converter, which is arranged upstream of the particle filter 1 and downstream of the feed device 4. The second aftertreatment device 5b may comprise an oxidation catalytic converter or nitrogen storage catalytic converter and is situated upstream of the feed device 4, the particle filter 1, and the first aftertreatment device 5a. Thus, the feed device 4 is arranged between the first and second aftertreatment devices 5a, 5b.

A pressure sensor 9 and a temperature sensor 10 for providing feedback regarding the pressure and the temperature of the exhaust gas flow 3, respectively, are situated between the first aftertreatment device 5a and the particle filter 1. The pressure sensor 3 may comprise a differential pressure sensor or relative pressure sensor. The measurement signals from the pressure sensor 9 and the temperature sensor 10 may be relayed to a control unit and/or a controller, which is configured to control the feed device as a function of the pressure and/or the temperature detected, as will be described in greater detail below.

A urea solution feed device 8 upstream of the feed device 4 and downstream of the further exhaust gas aftertreatment device 5b may be shaped to deliver urea solution to the exhaust gas flow 3. A common feed device may optionally be provided for delivering the urea solution and the composition. That is to say, the urea solution feed device 8 may be combined with the feed device 4 to form a single feed device, wherein the single feed device may be configured to flow the urea solution and the composition from the reservoir 6 separately. In some examples, the reservoir 6 may be further configured to comprise a solution comprise each of the urea solution and the micro-organism separately or mixed.

The arrangement may optionally comprise a turbocharger 7, which is arranged between the combustion engine 2 and the second aftertreatment device 5b.

As a further option, the exhaust system may comprise exhaust gas recirculation. The exhaust gas recirculation may be designed to duct exhaust gas out of the exhaust system from an exhaust gas extraction point to an exhaust gas introduction point arranged in an inlet air tract of the combustion engine. The exhaust gas recirculation may be a high-pressure or a low-pressure exhaust gas recirculation.

The arrangement according to FIG. 1 is a close-coupled embodiment, in which all components including the particle filter 1 are close-coupled to the engine. For an active regeneration of the particle filter 1 post-injection of fuel into the combustion engine 2 may be performed, to heat the particle filter 1 sufficiently for regeneration through combustion of this fuel without delivering the micro-organisms to the exhaust flow.

Turning now to FIG. 2, the arrangement therein differs from the arrangement according to FIG. 1 in that the particle filter 1 is arranged at the end of the exhaust tract in the area of the tailpipe and the feed device 4 is situated directly upstream of the particle filter 1. Thus, only the first and second aftertreatment devices are close-coupled to the engine 2 where exhaust gas temperatures may be hotter than the downstream location where the particle filter 1 is arranged.

The pressure sensor 9 and the temperature sensor 10 are arranged upstream of the feed device 4. An exothermic catalytic converter 12 and a fuel feed device 11 are arranged upstream of the pressure sensor 9 and the temperature sensor 10.

The arrangement in the example of FIG. 2 may be a close-coupled and underfloor embodiment, in which the particle filter 1 is arranged further away from the combustion engine 2, for example in the underfloor of a vehicle powered by the combustion engine 2. Thus, the first and second aftertreatment devices 5a, 5b may be arranged in a close-coupled position. The temperature thereby falls too sharply downstream of the further exhaust gas aftertreatment devices 5a, 5b situated close to the engine, so that a fuel feed device 11 and an exothermic catalytic converter 12 are provided, in order to be able to reach the temperature necessary for an active regeneration of the particle filter 1.

By arranging the particle filter 1 in the underfloor, the micro-organisms adsorbed thereon may be preserved through a greater range of engine operating conditions due to thermal loads at the particle filter 1 being lower in the underfloor arrangement compared to the close-coupled arrangement of FIG. 1. By doing this, regeneration of the particle filter 1 during engine-off or other conditions may occur at a higher rate due to the presence of more micro-organisms. However, the close-coupled position of the particle filter 1 in the example of FIG. 1 may have reduced packaging constraints compared to the underfloor arrangement of FIG. 2 due to the omission of the exothermic catalytic converter 12.

Turning now to FIG. 3, it depicts an example of a cylinder of internal combustion engine 100 included by engine system 107 of vehicle 105. Engine 100 may be used substantially similarly to engine 2 of FIGS. 1 and 2. Engine 100 may be controlled at least partially by a control system including controller 102 and by input from a vehicle operator 130 via an input device 132. In this example, input device 132 includes an accelerator pedal and a pedal position sensor 134 for generating a proportional pedal position signal PP. Cylinder 14 (which may be referred to herein as a combustion chamber) of engine 100 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 100.

One or more portions of the crankshaft 140 may be lubricated via oil housed in a crankcase 82. The crankcase 82 may be sized such that the crankshaft 140 may be actuated according to a full oscillation of the piston (e.g., from TDC to BDC or vice-versa). The crankcase 82 may be further coupled to a lubrication system of the engine. Thus, oil or other lubricants may enter and depart the crankcase 82. A sensor 84 may be configured to monitor a condition of the crankcase 82 and provide feedback to the controller 102. The sensor 84 may be configured to monitor one or more of a pressure, temperature, humidity, and the like. Herein, the sensor 84 is an oil sensor.

Cylinder 14 can receive intake air via a series of intake air passages 142, 144, and 146. Intake air passage 146 can communicate with other cylinders of engine 100 in addition to cylinder 14. FIG. 3 shows engine 100 configured with a turbocharger 175 including a compressor 174 arranged between intake passages 142 and 144, and an exhaust turbine 176 arranged along exhaust passage 148. Compressor 174 may be at least partially powered by exhaust turbine 176 via a shaft 180. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 3, or alternatively may be provided upstream of compressor 174.

Exhaust passage 148 can receive exhaust gases from other cylinders of engine 100 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three-way catalyst (TWC), NOx trap, various other emission control devices, or combinations thereof. In one example, emission control device 178 is a particle filter and may be used similarly to particle filter 1 of FIGS. 1 and 2.

An injector 184 is shown arranged between the turbine 176 and the particle filter 178. The injector 184 may be fluidly coupled to a reservoir 182 comprising a composition comprising a micro-organism capable of breaking down carbon-containing compounds. In some examples, the reservoir 182 may further comprise urea and the particle filter 178 may be combined with a selective reduction catalyst (SCR). The injector 184 is positioned to inject directly into the exhaust passage 148. In one example, there are no intervening components arranged between the injector 184 and the particle filter 178. In some examples, there may be an aftertreatment device arranged between the injector 184 and the particle filter 178. The injector 184, reservoir 182, and particle filter 178 may be used similarly to feed device 4, reservoir 6, and particle filter 1 of FIGS. 1 and 2, respectively.

Each cylinder of engine 100 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 100, including cylinder 14, may include at least two intake poppet valves and at least two exhaust poppet valves located at an upper region of the cylinder.

Intake valve 150 may be controlled by controller 102 via actuator 152. Similarly, exhaust valve 156 may be controlled by controller 102 via actuator 154. During some conditions, controller 102 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 102 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 100 may include a spark plug 192 for initiating combustion. Ignition system 190 can provide an ignition spark to cylinder 14 via spark plug 192 in response to spark advance signal SA from controller 102, under select operating modes. However, in some embodiments, spark plug 192 may be omitted, such as where engine 100 may initiate combustion by auto-ignition or by injection of fuel as may be the case with some diesel engines.

In some examples, each cylinder of engine 100 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 188. Fuel system 188 may include one or more fuel tanks, fuel pumps, and fuel rails. Fuel injector 166 is shown coupled directly to cylinder 14 for injecting fuel directly therein in proportion to the pulse width of signal FPW-1 received from controller 102 via electronic driver 168. In this manner, fuel injector 166 provides what is known as direct injection (hereafter referred to as "DI") of fuel into combustion cylinder 14. While FIG. 3 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 188 via a high pressure fuel pump, and a fuel rail. Further, the fuel tank may have a pressure transducer providing a signal to controller 102.

Fuel injector 170 is shown arranged in intake passage 146, rather than in cylinder 14, in a configuration that provides what is known as port fuel injection (hereafter referred to as "PFI") into the intake port upstream of cylinder 14. Fuel injector 170 may inject fuel, received from fuel system 188, in proportion to the pulse width of signal FPW-2 received from controller 102 via electronic driver 171. Note that a single driver 168 or 171 may be used for both fuel injection systems, or multiple drivers, for example driver 168 for fuel injector 166 and driver 171 for fuel injector 170, may be used, as depicted.

Controller 102 is shown in FIG. 3 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 102 may receive various signals from sensors coupled to engine 100, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 102 from signal PIP. Manifold pressure signal MAP from a manifold pressure sensor may be used to provide an indication of vacuum, or pressure, in the intake manifold. Controller 102 may infer an engine temperature based on an engine coolant temperature.

As described above, FIG. 3 shows only one cylinder of a multi-cylinder engine. As such, each cylinder may similarly include its own set of intake/exhaust valves, fuel injector(s), spark plug, etc. It will be appreciated that engine 100 may include any suitable number of cylinders, including 2, 3, 4, 5, 6, 8, 10, 12, or more cylinders. Further, each of these cylinders can include some or all of the various components described and depicted by FIG. 3 with reference to cylinder 14.

In some examples, vehicle 105 may be a hybrid vehicle with multiple sources of torque available to one or more vehicle wheels 55. In other examples, vehicle 105 is a conventional vehicle with only an engine. In the example shown, vehicle 105 includes engine 100 and an electric machine 52. Electric machine 52 may be a motor or a motor/generator. Crankshaft 140 of engine 100 and electric machine 52 are connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 102 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from an energy storage device 58 (herein, battery 58) to provide torque to vehicle wheels 55. Electric machine 52 may also be operated as a generator to provide electrical power to charge battery 58, for example during a braking operation. In some examples, the electric machine 52 may be coupled to the turbine 176, as will be described in greater detail below.

The controller 102 receives signals from the various sensors of FIG. 3 and employs the various actuators of FIG. 3 to adjust engine operation based on the received signals and instructions stored on a memory of the controller. For example, adjusting engine operating parameters may include adjusting an actuator of the exhaust valve 156, an actuator of the spark plug 192, and an actuator of the fuel injector 166 in response to feedback from the sensor 84.

Turning now to FIG. 4, it shows a method 400 for introducing the composition comprising the micro-organism into an exhaust passage. Instructions for carrying out method 400 may be executed by a controller based on instructions stored on a memory of the controller and in conjunction with signals received from sensors of the engine system, such as the sensors described above with reference to FIG. 3. The controller may employ engine actuators of the engine system to adjust engine operation, according to the methods described below.

The method 400 begins at 402, where the method 400 may include determining, estimating, and/or measuring current engine operating parameters. Current engine operating parameters may include, but are not limited to, one or more of throttle position, engine temperature, engine speed, manifold pressure, vehicle speed, exhaust gas recirculation flow rate, and air/fuel ratio.

The method 400 may proceed to 404, which may include determining if the engine is off. The engine being off may include engine conditions where combustion does not occur. Some examples of the engine being off may include a park event, vehicle coasting, and an electric-only operation mode of a vehicle. The park event may include an ignition key being removed or ignition button being depressed, thereby shutting off the engine. The vehicle coasting event may include preventing fuel flow to the engine such that combustion does not occur. During some vehicle coasting events, air may continue to be compressed within the engine, thereby flowing air to the exhaust passage. The electric-only operation mode of the vehicle may include consuming a charge of an energy storage device to power an electric motor configured to propel the vehicle. During the electric-only operation mode, the engine may be deactivated and fuel may not flow thereto.

If the engine is not off and is still combusting and receiving fuel, then the method 400 may proceed to 406 to maintain current operating parameters and does not introduce the composition comprising the micro-organism into the exhaust passage. If the engine is off and no longer receiving fuel, then the method 400 may proceed to 408, which may include determining if a threshold duration has elapsed. The threshold duration may be based on an amount of time needed following the engine off event for exhaust gas temperatures and pressures to decrease to a threshold temperature and a threshold pressure. The threshold temperature may be based on a temperature where a rate of regeneration via the micro-organisms is relatively high. Additionally or alternatively, the threshold temperature may be equal to an ambient temperature. In some examples, the threshold pressure may be substantially equal to an atmospheric pressure. If the threshold duration has not elapsed, then the method 400 may proceed to 406 to maintain current engine operating parameters and does not introduce the micro-organism, as described above.

If the threshold duration has elapsed, then the method 400 may proceed to 410, which may include determining if a particle filter load is greater than a threshold load. The threshold load may be based on a particle filter load within 10% of a maximum load of the particle filter. Additionally or alternatively, the threshold load may be based on a backpressure generated as soot accumulates onto the particle filter, wherein the threshold load may be based on a backpressure which hampers combustion stability. In some examples, the particle filter load may be estimated based on feedback from one or more of an exhaust flow sensor and an exhaust pressure sensor. Additionally or alternatively, the particle filter load may be tracked over time.

If the particle filter load is less than or equal to the threshold load, then the method 400 may proceed to 406 as described above. As such, the micro-organism may not be introduced to the exhaust passage and regeneration of the particle filter may not occur during the engine-off event. By doing this, the micro-organism may be preserved during conditions where regeneration is demanded (e.g., when the particle filter load is greater than the threshold load). By preserving the micro-organism, the reservoir housing the composition comprising the micro-organism may be refilled less frequently. Furthermore, passive regeneration, where the filter is regenerated as a byproduct of current engine operating parameters, and active regeneration via a post-fuel injection may be utilized upon a future engine start, which may be cost-effective and less cumbersome to a vehicle operator.

If the particle filter load is greater than the threshold load and a particle filter regeneration is demanded, then the method 400 may proceed to 412, which may include introducing the micro-organism into the exhaust passage. Introducing the micro-organism may include injecting the composition including the micro-organism into the exhaust passage. In some examples, the injecting may include injecting the composition directly toward an upstream surface of the particle filter. The injector may atomize the composition prior to injecting the composition into the exhaust passage. The controller (e.g., controller 12 of FIG. 1) may signal to an actuator of the injector to inject an amount of the composition. In some examples, the amount may be fixed. In other examples, the amount may be adjusted in response to a difference between the particle filter load and the threshold load, wherein the amount increases as the difference increases.

In some examples of the method 400, 410 may be omitted such that the micro-organism is injected following the threshold duration being elapsed. Additionally or alternatively, introduction of the micro-organism in response to the particle filter load being less than or equal to the threshold load may include introducing less of the composition comprising the micro-organism than when the particle filter load is greater than the threshold load. That is to say, a lesser amount of composition comprising the micro-organism may be introduced in the absence of a regeneration being desired compared to the amount of composition introduced in the presence of the regeneration being desired. By doing this, the particle filter load may be reduced while conserving an amount of the composition comprising the micro-organism in the reservoir.

Turning now to FIG. 5, it shows a method 500 for determining whether to actively regenerate the particle filter via introduction of the composition comprising the micro-organism or a post injection. The method 500 begins at 502, which includes determining if a particle filter regeneration is desired. As described above, the particle filter regeneration may be desired if the particle filter load is greater than a threshold load, which may be estimated based on an exhaust backpressure or tracked over time.

If the particle filter regeneration is not desired, then the method 500 may proceed to 504, which includes maintain current operating parameters and does not actively regenerate the particle filter. However, passive regeneration may occur due to engine operating parameters increasing an exhaust gas temperature to meet a threshold regeneration temperature. This may occur during highway driving.

If the particle filter regeneration is desired, then the method 500 may proceed to 506, which may include determining if an exhaust gas temperature is greater than a first threshold temperature. The first threshold temperature may be based on an exhaust gas temperature where the micro-organisms capable of breaking down soot and other carbon containing compounds may survive. In some examples, the first threshold temperature may be substantially equal to an ambient temperature. In some examples, additionally or alternatively, the first threshold temperature is less than 90° C. Thus, if the exhaust gas temperature is greater than the first threshold temperature then the micro-organisms may degrade and regenerate the particle filter at less than a desired rate, thereby decreasing an efficiency of the micro-organisms, which may result in fewer regenerations of the particle filter and more refilling of the reservoir housing the composition comprising the micro-organism.

If the exhaust gas temperature is not greater than the first threshold temperature, then the method 500 may proceed to 508, which may include actively regenerating the particle filter by introducing the composition comprising the micro-organism to the exhaust passage. As described above, the introducing may include injecting the micro-organism into the exhaust passage. By actively regenerating when the particle filter with the micro-organism when the exhaust temperature is not greater than the first threshold temperature, a fuel efficiency may increase as an active regeneration via a post-injection of fuel is avoided.

If the exhaust temperature is greater than the first threshold temperature, then the method may not actively regenerate the particle filter via the micro-organism and may proceed to 510, which may include determining if the exhaust gas temperature is greater than a second threshold temperature, which is greater than the first threshold temperature. The second threshold temperature may correspond to an exhaust gas temperature where passive regeneration may occur. In some examples, the second threshold temperature may be substantially equal to 450° C. or greater.

If the exhaust gas temperature is not greater than the second threshold temperature, then the exhaust gas temperature is between the first threshold temperature and the second threshold temperature, where passive regeneration may not occur and active regeneration via the micro-organism may be inefficient due to the exhaust gas being too hot. As such, the method 500 may proceed to 512, which may include actively regenerating the particle filter via a post-injection of fuel. The post-injection of fuel may occur in a combustion chamber or directly in the exhaust passage. The post-injection of fuel may allow unburned fuel to flow to the exhaust passage, where the fuel may combust in the exhaust passage, thereby increasing a temperature of exhaust gas flowing to the particle filter. As such, active regeneration of the particle filter may occur.

If the exhaust gas temperature is greater than the second threshold temperature, then the method 500 may proceed to 514, which includes passively regenerating the particle filter without introducing the micro-organism or the post-injection of fuel. It will be appreciated that passive regeneration may also occur during engine conditions where particle filter regeneration is not desired as passive regeneration conditions may be met in response to adjusting engine operating conditions based on at least a driver demand.

In this way, a vehicle may comprise a first method for active regeneration of a particle filter during engine combustion events and a second method for active regeneration during engine off events. The first and second methods may be opportunistically executed based on one or more of driver behavior and current engine operating parameters. The first method may include a post-injection of fuel and the second method may include introducing a composition comprising a micro-organism The technical effect of introducing the micro-organism into the exhaust passage during lower temperature conditions is to increase fuel economy. Additionally, a lifespan of the micro-organism may be increased during lower temperature conditions such that the particle filter load may decrease more.

An embodiment of a method comprising actively regenerating a particle filter via a micro-organism that breaks down carbon-containing compounds during a first condition and actively regenerating the particle filter via a post-injection of fuel during a second condition. A first example of the method further comprises where actively regenerating the particle filter via the micro-organism includes injecting a composition comprising the micro-organism from a feed device mounted to a surface of an exhaust passage housing the particle filter. A second example of the method, optionally including the first example, further comprises where the first condition occurs after the engine is deactivated. A third example of the method, optionally including the first and/or second examples, further includes where the first condition includes an exhaust gas temperature being less than a first threshold temperature. A fourth example of the method, optionally including one or more of the first through third examples, further includes where the second condition includes the exhaust gas temperature being greater than the first threshold temperature and less than a second threshold temperature. A fifth example of the method, optionally including one or more of the first through fourth examples, further includes where the second condition occurs when the engine is activated and combusting fuel.

An embodiment of a system comprising a particle filter shaped to remove carbon-laden fine dust from an exhaust gas flow in an exhaust passage fluidly coupled a combustion engine, and where a feed device is arranged between the combustion engine and the particle filter in the exhaust passage, the feed device positioned to introduce a composition comprising micro-organisms that break down constituents contained in the fine dust. A first example of the system further includes where the micro-organisms that break down constituents contained in the fine dust are selected from a group comprising hydrocarbonoclastic bacteria, fungi, and archaea. A second example of the system, optionally including the first example, further includes where the particle filter is a diesel particle filter or an SCR-coated particle filter.

An embodiment of a system comprising an engine fluidly coupled to an exhaust passage housing a particle filter, a feed device positioned to introduce a composition into the exhaust passage upstream of the particle filter, wherein the feed device is fluidly coupled to a reservoir housing the composition which comprises at least a micro-organism capable of breaking down carbon-containing compounds, and a controller with computer-readable instructions stored on non-transitory memory thereof that when executed enable the controller to introduce the composition into the exhaust passage in response to one or more of an exhaust gas temperature being less than a threshold temperature and a particle filter load being greater than a threshold load. A first example of the system further includes where introducing the composition into the exhaust passage includes injecting the composition into an exhaust flow upstream of the particle filter. A second example of the system, optionally including the first example, further includes where introducing the composition into the exhaust passage includes injecting the composition at an upstream surface of the particle filter. A third example of the system, optionally including the first and/or second examples, further includes where the exhaust passage comprises a tailpipe, and where the particle filter is arranged distal to the tailpipe in a close-coupled position relative to the engine. A fourth example of the system, optionally including one or more of the first through third examples, further includes where the exhaust passage comprises a tailpipe, and where the particle filter is arranged in a vehicle underbody proximal to the tailpipe. A fifth example of the system, optionally including one or more of the first through fourth examples, further includes where the particle filter is combined with a selective reduction catalyst. A sixth example of the system, optionally including one or more of the first through fifth examples, further includes where the feed device is shaped to inject a reductant for the selective reduction catalyst. A seventh example of the system, optionally including one or more of the first through sixth examples, further includes where the composition further comprises a reductant for the selective reduction catalyst. An eighth example of the system, optionally including one or more of the first through seventh examples, further includes where the controller further includes instructions to adjust a post-injection amount of fuel in response to the exhaust gas temperature being greater than the threshold temperature. A ninth example of the system, optionally including one or more of the first through eighth examples, further includes where an aftertreatment device is arranged upstream of the particle filter, and where the feed device is arranged upstream or downstream of the aftertreatment device. A tenth example of the system, optionally including one or more of the first through ninth examples, further includes where the micro-organisms that break down constituents contained in soot captured by the particle filter are selected from a group comprising hydrocarbonoclastic bacteria, fungi, and archaea.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a vehicle having an engine and a particle filter in an engine exhaust, comprising:
regenerating the particle filter via a micro-organism that breaks down carbon-containing compounds during a first condition by injecting a composition comprising the micro-organism from a feed device mounted to a surface of an exhaust passage housing the particle filter, where the feed device is arranged between the engine and the particle filter in the exhaust passage, the feed device positioned to introduce the composition.

2. The method of claim 1, wherein the first condition includes the engine being deactivated.

3. The method of claim 1, wherein the first condition includes an exhaust gas temperature being less than a first threshold temperature.

4. The method of claim 3, further comprising regenerating the particle filter via a post-injection of reductant during a second condition, where the second condition includes the exhaust gas temperature being greater than the first threshold temperature and less than a second threshold temperature.

5. The method of claim 4, wherein the second condition occurs when the engine is activated and combusting fuel.

6. A system comprising:
a particle filter shaped to remove carbon-laden fine dust from an exhaust gas flow in an exhaust passage fluidly coupled a combustion engine, and where a feed device is arranged between the combustion engine and the particle filter in the exhaust passage, the feed device positioned to introduce a composition comprising micro-organisms that break down constituents contained in the fine dust.

7. The system of claim 6, wherein the micro-organisms that break down constituents contained in the fine dust are selected from a group comprising hydrocarbonoclastic bacteria, fungi, and archaea.

8. The system of claim 6, wherein the particle filter is a diesel particle filter or an SCR-coated particle filter.

9. A system comprising:
an engine fluidly coupled to an exhaust passage housing a particle filter;
a feed device positioned to introduce a composition into the exhaust passage upstream of the particle filter, wherein the feed device is fluidly coupled to a reservoir housing the composition which comprises at least a micro-organism capable of breaking down carbon-containing compounds; and
a controller with computer-readable instructions stored on non-transitory memory thereof that when executed enable the controller to:
introduce the composition into the exhaust passage in response to operating conditions.

10. The system of claim 9, wherein the operating conditions include one or more of an exhaust gas temperature being less than a threshold temperature and a particle filter load being greater than a threshold load, and wherein introducing the composition into the exhaust passage includes injecting the composition into an exhaust flow upstream of the particle filter.

11. The system of claim 9, wherein introducing the composition into the exhaust passage includes injecting the composition at an upstream surface of the particle filter.

12. The system of claim 9, wherein the exhaust passage comprises a tailpipe, and where the particle filter is arranged distal to the tailpipe in a close-coupled position to the engine.

13. The system of claim 9, wherein the exhaust passage comprises a tailpipe, and where the particle filter is arranged in a vehicle underbody proximal to the tailpipe.

14. The system of claim 9, wherein the particle filter is combined with a selective reduction catalyst.

15. The system of claim 14, wherein the feed device is shaped to inject a reductant for the selective reduction catalyst.

16. The system of claim 14, wherein the composition further comprises a reductant for the selective reduction catalyst.

17. The system of claim 10, wherein the controller further includes instructions to adjust a post-injection amount of fuel in response to the exhaust gas temperature being greater than the threshold temperature.

18. The system of claim 9, further comprising an aftertreatment device arranged upstream of the particle filter, and where the feed device is arranged upstream or downstream of the aftertreatment device.

19. The system of claim 9, wherein the micro-organisms that break down constituents contained in soot captured by the particle filter are selected from a group comprising hydrocarbonoclastic bacteria, fungi, and archaea.

* * * * *